J. A. HARRIS.
NUT LOCK.
APPLICATION FILED SEPT. 19, 1910.
995,136.
Patented June 13, 1911.
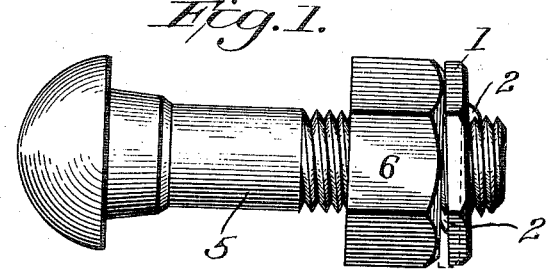
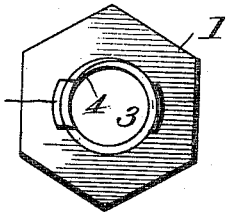
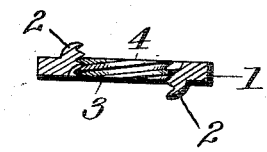
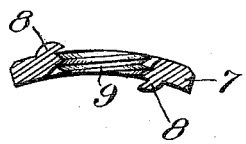
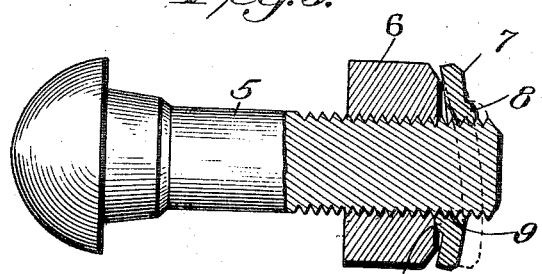
Witnesses
Inventor
Joseph A. Harris
By Edam Bros
Attorneys

UNITED STATES PATENT OFFICE.

JOSEPH A. HARRIS, OF BOSTON, MASSACHUSETTS.

NUT-LOCK.

995,136.  Specification of Letters Patent.  Patented June 13, 1911.

Application filed September 19, 1910. Serial No. 582,783.

*To all whom it may concern:*

Be it known that I, JOSEPH A. HARRIS, a citizen of the United States, residing at Boston, in the county of Suffolk and State of Massachusetts, have invented certain new and useful Improvements in Nut-Locks; and I do hereby declare the following to be a full, clear, and exact description of the invention, such as will enable others skilled in the art to which it appertains to make and use the same.

My invention relates to a torsional lock for bolts which can be embodied either in a self-locking nut adapted to hold itself in position on the bolt and against the surface upon which it bears or in an elastic yielding plate or washer adapted to be screwed upon the bolt, exteriorly to the primary nut, and designed to bear upon the bolt threads and upon said primary nut to secure a compound frictional contact therewith. These results are due, first, to the increased friction attained between the lock and the surface against which the lock bears, and, second to the tendency of the threads in the torsional lock to cross the threads of the bolt whereby a strong torsional resistance is produced between the lock and the surface upon which it bears, and to grip upon the bolt threads so that the lock must remain immovable upon the bolt but, at the same time, a yielding tension is provided for the restricted torsional lock which is very desirable, especially when the nut lock is used on machinery and in fish-plates of rails which are subjected to jars and vibrations having a tendency to make the nuts work loose.

The object of my present invention is to increase the efficiency of the nut lock by providing additional means which tend to bind the threads of the nut lock upon the threads of the bolt.

My improvement may be applied to either a flat locking-washer or plate, or to one that is concaved on the side next to the primary nut or metallic surface against which the nut lock bears.

The threads in the torsional lock are cut with their axes oblique to the axis of said torsion lock so that when the lock is screwed on the bolt, it will assume a diagonal position to the longitudinal axis of the bolt, and, as it is screwed home against the surface upon which it is designed to bear, said lock is deflected from its diagonal position to a straight position parallel to and tightly against said bearing surface. The tightening of the torsional lock against the primary nut or other bearing surface operates to compress the outer threads of said lock against the threads of the bolt as the inner concave side of the lock is caused to spread or open out by increasing the frictional contact, that is to say, while the outer edges of the lock and its inner threads are caused to spread at the concaved base of the lock, the outer threads thereof will be compressed and drawn together tightly against the thread of the bolt. Furthermore, the diagonal threads in the lock cause the same to assume an inclined position on the bolt thereby bringing one edge of the lock first in contact with the bearing surface so that, as the lock is screwed home against said surface, said lock is deflected from its initial diagonal position to a position at right angles to the axis of the bolt and parallel with the surface on which the lock bears, thus causing the threads of the lock to bind still more tightly and securely upon the threads of the bolt.

The lock possesses the additional and very desirable quality, when made in the form of an elastic plate or washer, of affording a torsional spring resistance which effectually prevents it from being jolted or jarred loose when applied to machinery or fish-plates of rails.

A nut designed to lock itself on a bolt against a metallic bearing surface is made somewhat thicker and stronger than the elastic yielding plate or washer which is designed to fasten a primary nut, but both the self-locking nut and the elastic washer can be used on the same bolt to lock the nut itself on said bolt, or they can be used in connection with a primary nut where greater strength and length of thread are required for the bolt, as the improved self-locking nut acts as a very powerful and effective jam-nut.

The essential feature of the present improvement is one or more lugs or shoulders punched out on the side of the washer or plate. Two lugs is the preferable number and they can be easily stamped or punched out when the hole is cut and before the nut lock is threaded. On a large bolt, it might be desirable to use three lugs. When two lugs are used, one is arranged on each side of the washer. The body of the washer or nut lock is of uniform thickness except where the lugs project. It will be understood that the nut lock is reversible, that is, may be applied to a bolt with either side facing the bearing surface or primary nut, except when the concaved form of nut lock is used, when the concaved side must go next to the bearing surface or primary nut.

In forming the nut lock or washer, the shoulders or lugs can easily be formed by one operation when the hole is punched therein, or said shoulders or projections may be made in any other suitable manner. The thread in the nut lock is extended on to the shoulders or lugs whereby an additional binding area is provided for engaging the thread of the bolt. The thread in the nut lock and its lugs may be formed in one operation by tapping right through said washer and lugs, it being understood that this thread is arranged obliquely to the axis of the nut lock.

When my improved nut lock is screwed upon a bolt, its inclined position, with respect to the axis of said bolt, causes the lug or shoulder on the inner face of the nut lock to come in contact with the bearing surface or primary nut before the main inner surface of said nut lock. In tightening the washer, its inner shoulder or lug is brought to bear forcibly against the bearing surface or primary nut and compressed to some extent with the result that a kink is given to the washer as well as the thread therein causing it to clamp very tightly upon the thread of the bolt without causing any rupture. At the same time, the outer lug on said nut lock is drawn in and caused to bind upon the thread of the bolt, as hereinbefore described, owing to the deflecting of said lock from its initial diagonal position to a position at right angles to the axis of the bolt. It is obvious, of course, that the threads on said outer shoulder or projection will bind more forcibly upon the threads of the bolt because they extend beyond the nut lock. This binding action of the outer lug is increased when the concaved form of washer is used for the reason already explained, namely, that while the inner face of the concaved washer is caused to spread, when said washer is screwed home against the bearing surface or primary nut, the outer threads will be compressed and drawn together tightly against the thread of the bolt.

In the accompanying drawing illustrating the preferred embodiments of my invention: Figure 1 is an elevation of a bolt with a primary nut and nut lock mounted thereon, the initial oblique position of the nut lock being shown in solid lines and its final position, at right angles to the axis of the bolt and flat against the primary nut, being illustrated in dotted lines. Fig. 2 is a plan view of the nut lock alone. Fig. 3 is a sectional view of said nut lock, taken through the projecting lugs or shoulders. Fig. 4 is a similar sectional view of a concave washer, and Fig. 5 is a sectional view of a bolt, primary nut and concave nut lock showing its initial oblique position in dotted lines and its final position in solid lines.

The nut lock disclosed herein should be made of mild steel of low carbon and of just sufficient flexibility to allow it to yield as it is screwed home over a primary nut until it lies flat against the latter. Said nut lock or washer may be made in any of the usual forms, but is preferably hexagonal, as illustrated. The oppositely extending lugs or shoulders 2 are formed on the washer 1 adjacent to the opening or hole 3 therein. The thread 4, which is cut oblique to the axis of the washer, is continued on said lugs.

In the drawing, 5 designates the bolt and 6 the primary nut. The primary nut is the equivalent of a metallic bearing surface or work against which the nut lock may be used alone as a lock nut, as the action of the washer is the same in either case.

In Figs. 4 and 5 of the drawing, 7 designates the concave washer, 8 the oppositely extending shoulders formed thereon, and 9 the thread cut therein. It will be noted in Fig. 5 how the outer face of the washer is contracted around the thread of the bolt when said washer is screwed up to its final position at right angles to the axis of said bolt. This is shown by the difference in diameter of the outer surface of the washer, as shown in solid and dotted lines.

By the use of the projecting shoulders or lugs on my improved nut lock, I, in effect, obtain all the advantages, as far as clamping power is concerned, of a much thicker washer. By reducing the thickness of the washer, I not only secure the beneficial resiliency, especially necessary for a concave nut lock, but also save metal in the manufacture of the washer, reduce the weight thereof and provide a nut lock which admits of a minimum length of bolt. Because the thread of the bolt is not injured by the use of my nut lock thereon, the latter may be used over again and reversed, if desired.

Experiments have shown that the under shoulder of the steel washer being harder than the iron nut, it will scrape, or cut into, or embed itself in the primary nut so that the washer can be forced down flat, causing an increased binding contact, thereby still more effectually preventing any reverse movement of the washer except by the force of a wrench.

I do not limit myself to the details of construction herein described and illustrated in the accompanying drawing but reserve the right to make such changes as fairly fall within the scope of the appended claims.

I claim:

1. A nut lock, substantially as described, having the axis of its threads oblique to the axis of said lock, and provided with a lug or shoulder projecting from one of its faces adjacent to the threaded opening therein, the threads being continued on said shoulder for the purpose specified.

2. A nut lock, substantially as described, having the axis of its threads oblique to the axis of said lock, and provided with a lug or shoulder projecting from the inner face thereof adjacent to the threaded opening therein, the threads being continued on said shoulder for the purpose specified.

3. A nut lock, substantially as described, having the axis of its threads oblique to the axis of said lock, and provided with a lug or shoulder projecting from the outer face thereof adjacent to the threaded opening therein, the threads being continued on said shoulder for the purpose specified.

4. A nut lock, substantially as described, having the axis of its threads oblique to the axis of said lock, and provided with lugs or shoulders projecting from the opposite faces thereof, the threads being continued on said shoulders for the purpose specified.

5. A nut lock, substantially as described, having the axis of its threads oblique to the axis of said lock, and provided with a concavity extending from edge to edge of its inner face, and a shoulder projecting from said concave face adjacent to the threaded opening therein, the threads being continued on said shoulders for the purpose specified.

6. A nut lock, substantially as described, having the axis of its threads oblique to the axis of said lock, and provided with a concavity extending from edge to edge of its inner face, and a shoulder projecting from its outer face adjacent to the threaded opening therein, the threads being continued on said shoulders for the purpose specified.

7. A nut lock, substantially as described, having the axis of its threads oblique to the axis of said lock, and provided with a concavity extending from edge to edge of its inner face, and shoulders projecting from the opposite faces thereof adjacent to the threaded opening therein, the threads being continued on said shoulders for the purpose specified.

In testimony whereof, I affix my signature, in presence of two witnesses.

JOSEPH A. HARRIS.

Witnesses:
EDWARD P. BOYNTON,
FRANCIS H. THAYER.